United States Patent
Kuo et al.

(10) Patent No.: US 10,116,739 B2
(45) Date of Patent: Oct. 30, 2018

(54) METHOD FOR ENABLING POINT-TO-POINT TRANSMISSION AND NETWORK CONNECTING DEVICE

(71) Applicants: ThroughTek Technology (ShenZhen) Co., Ltd., Shenzhen (CN); ThroughTek Co., Ltd., Taipei (TW)

(72) Inventors: Chi-Ming Kuo, Taipei (TW); Chong-Kuang Chen, Taipei (TW)

(73) Assignees: THROUGHTEK TECHNOLOGY (SHENZHEN) CO., LTD., Shenzhen (CN); THROUGHTEK CO., LTD., Taipei (TW)

( * ) Notice: Subject to any disclaimer, the term of this patent is extended or adjusted under 35 U.S.C. 154(b) by 214 days.

(21) Appl. No.: 14/620,740

(22) Filed: Feb. 12, 2015

(65) Prior Publication Data
US 2015/0365279 A1    Dec. 17, 2015

(30) Foreign Application Priority Data
Jun. 13, 2014 (TW) .............................. 103120400 A

(51) Int. Cl.
*H04L 29/08* (2006.01)
*H04L 12/24* (2006.01)

(52) U.S. Cl.
CPC ........ *H04L 67/104* (2013.01); *H04L 41/0803* (2013.01)

(58) Field of Classification Search
CPC .................... H04L 41/0803; H04L 67/104
See application file for complete search history.

(56) References Cited

U.S. PATENT DOCUMENTS

| | | | |
|---|---|---|---|
| 2002/0138291 A1* | 9/2002 | Vaidyanathan | G06Q 30/06 705/26.1 |
| 2006/0101185 A1 | 5/2006 | Kapoor et al. | |
| 2012/0198040 A1* | 8/2012 | Kuo | H04L 41/00 709/223 |
| 2012/0221685 A1* | 8/2012 | Wu | H04W 76/02 709/218 |

FOREIGN PATENT DOCUMENTS

| | | |
|---|---|---|
| CN | 1474587 A | 2/2004 |
| CN | 1166124 C | 9/2004 |
| CN | 1914880 A | 2/2007 |
| CN | 103260262 A | 8/2013 |

* cited by examiner

*Primary Examiner* — Gil H. Lee
(74) *Attorney, Agent, or Firm* — McClure, Qualey & Rodack, LLP

(57) ABSTRACT

A method is developed for enabling a host device to perform point-to-point (P2P) transmission. The method includes providing device identification, P2P program instructions and a server. The device identification is stored in an external device and the P2P instructions are installed on the host device. The server helps the host device to connect to other P2P devices under P2P approach.

17 Claims, 7 Drawing Sheets

METHOD FOR ENABLING POINT-TO-POINT TRANSMISSION AND NETWORK CONNECTING DEVICE

CROSS-REFERENCES TO RELATED APPLICATIONS

This non-provisional application claims priority under 35 U.S.C. § 119(a) on Patent Application No. 103120400 filed in Taiwan, R.O.C. on Jun. 13, 2014, the entire contents of which are hereby incorporated by reference.

FIELD OF INVENTION

The present invention relates to a method for enabling point-to-point transmission and a network connecting device, and more related to a method enabling a host device to be able to perform point-to-point transmission and a related network connecting device.

BACKGROUND OF THE INVENTION

Various electronic devices are developed to improve human life. But, there are still many technical problems need to be solve to provide more convenient user experience and various associated applications. For example, in today's network environment, if a user wants to make two devices to be connected, the users usually need to spend a lot of time on complicated configuration. When the two devices are in different sub-networks, such configuration would be even more complicated. Therefore, it is beneficial to simplify network connection establishment as well as connection efficiency.

SUMMARY OF INVENTION

An embodiment of the present invention is a method for enabling a host device to be able to perform point-to-point connection. First, a device identification is provided to be stored in an external device. The external device is used to be connected to a host device. The host device is provided with a point-to-point instruction to be installed and executed on the host device. In addition, a server is provided. After the host device is installed with the point-to-point instruction, the host device, according to the point-to-point instruction, informs the server with connection data and an unique identification of the host device. The unique identification is used to identify the host device in a point-to-point network. The unique identification is related to the device identification of the host device. For example, the device identification is directly used as the unique identification. Alternatively, the device identification is used in a function to generating the unique identification. Alternatively, the host device transmits the device identification to the server, and the server returns the unique identification after certain predetermined authentication.

Then, the server helps other point-to-point devices to be point-to-point connected to the host device over the point-to-point network. The server may be implemented with one or more server devices, each being responsible for different tasks. For example, one or more than server devices are used to construct a server to provide the unique identification or helps establishment of point-to-point connection.

The host device mentioned above may be a computer, a mobile phone, a tablet computer like an IPAD, an industrial computer, a camera, a wire or wireless storage, a multimedia player, a set-top box, or any other electronic devices. The external device mentioned here may be a memory card, a thumb drive, an USB network card, an USB wireless router, a BLUETOOTH earphone, or any other wire or wireless devices.

In short, when an external device stored with device identification is connected to a host device via USB or other wire or wireless connection so that the host device retrieves a unique identification directly or indirectly to have an identity over a point-to-point network. Afterwards, other point-to-point devices over the point-to-point network may establish a point-to-point connection with the host device via help of a server. A connection request may be issued by a host device or by any other point-to-point devices. Resources on a host device may include, but not limited to, a camera of the host device, a microphone, a sensor, a BLUETOOTH earphone, a local hard drive, a network drive, a wireless connected display, or any devices attached to the host device. After the point-to-point connection is established, the resources of the host device may be accessed by other point-to-point device with the point-to-point instruction installed and executed on the host device.

In another embodiment, a network connecting device is used as an external device to be connected to a host device. The network connecting device has an connecting interface to be connected to the host device. The network connecting device also includes a storage, which may be any types of memory devices, e.g. a flash memory, a read-only-memory (ROM), for storing device identification. After the host device is connected to the network connecting device and the host device retrieves the point-to-point instruction from a network, the host device reads the device identification and obtains an associated unique identification. The host device provides a point-to-point connection with other point-to-point devices by executing the point-to-point instruction.

Besides, the network connecting device may have a network connecting circuit to provide a network service following a communication protocol. For example, the network connecting circuit may be a Wi-Fi router for establishing a Wi-Fi local network for other Wi-Fi devices to connect to the Wi-Fi local network. Alternatively, the network connecting circuit may implement a 3G network adaptor or a Wi-Fi adaptor for the host device to connect to a 3G network or a Wi-Fi local network.

DETAILED DESCRIPTION

Figure 1:
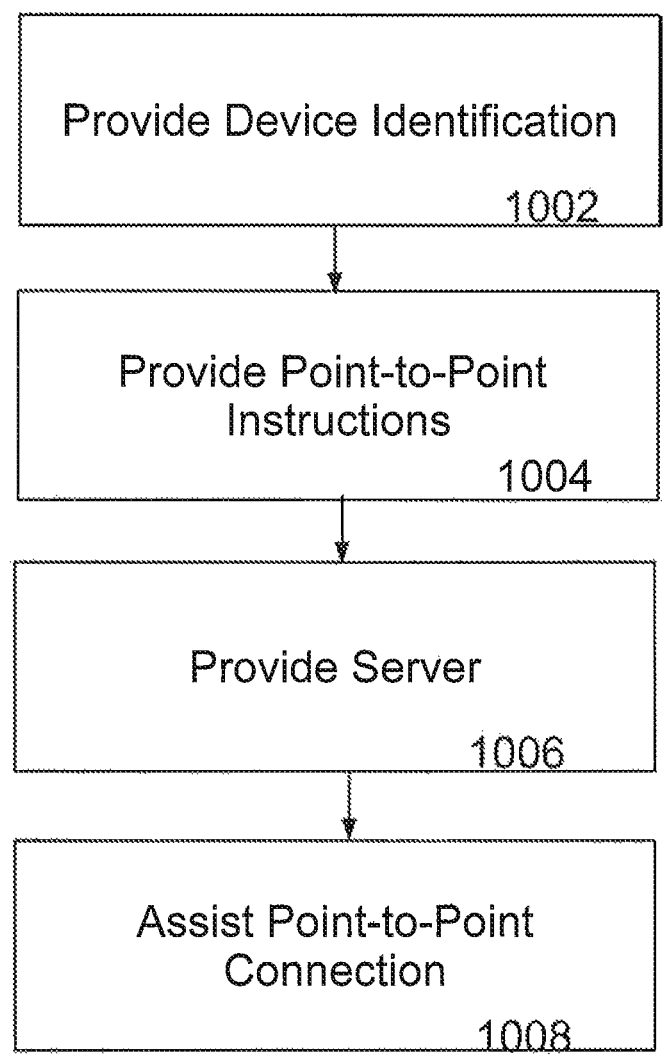
FIG. 1 illustrates a method of an embodiment according to the present invention.

FIG. 1 illustrates a method for enabling a host device to be able to perform point-to-point transmission. A device identification is provided (step 1002) and stored in an external device. The external device is used to be connected to the host device. A point-to-point program instruction is provided to the host device to be installed. A server is provided (step 1006). After the host device is installed the point-to-point instruction, the host device informs the server with connection data and an unique identification of the host device. The unique identification is used for identifying the host device over a point-to-point network. The unique identification is related to the device identification. For example, the unique identification is directly the device identification. Or the host device calculates the device identification with a function to get the unique identification. Alternatively, the host device sends the device identification to a server. The server performs authentication and calculation and returns the unique identification.

Next, the server helps the host device and other point-to-point devices to be connected in point-to-point style (step 1008). The server may be implemented by one or more server devices cooperating together to achieve the desired functions. For example, one or more server devices construct a server for providing unique identification codes or assisting point-to-point connection.

The host device may refer to a computer, a mobile phone, a tablet computer, an industrial computer, a camcorder, a wireless or wire storage, a multimedia player, a set top box or any other electronic devices. The external device may refer to a memory card, a thumb drive, an USB wireless network card, an USB wireless router, a BLUETOOTH earphone, or any other wire or wireless devices.

In other words, when an external device storing an unique identification is connected to the host device via USB interface or other wire or wireless interface, the host device directly or indirectly retrieves the unique identification to get an identity in a point-to-point network. After that, other point-to-point devices over a point-to-point network may connect to the host device via a point-to-point connection with assistance of a server. The request for the point-to-point connection may be triggered by the host device or by the other point-to-point devices. With the point-to-point connection, various resources on the host device, e.g. a camcorder, a microphone, a temperature detector, a sensor, a BLUETOOTH earphone, a local hard disk, a connected network drive, a wireless connected monitor, may be defined by point-to-point instructions installed on the host device.

In addition to storing the device identification, the external device may have other circuits and related functions. For example, an USB wireless router may be stored with a device identification. When the USB router is connected to a host device, a wireless local network is constructed for one or more wireless devices to connect to the wireless local network, like to establish a Wi-Fi local wireless network. Please be noted that such wireless network may be replaced with other network protocols. When the host device itself has a network interface, wireless network devices in the wireless network may be connected to an external network, e.g. the Internet, via the network interface.

The external device may also be designed as a simple network card, like a Wi-Fi or a 3G network card so that when the host device is connected to the external device, the host device obtains network connectivity via the external device to connect to a local network, a wide range network and/or the Internet.

In addition to the device identification, the external device may also store automatic execution instructions. Once the host device is connected to the external device, the automatic instructions are loaded to perform all or a portion of functions as mentioned above or to instruct, drive, indicate the host device to download aforementioned point-to-point instructions.

The point-to-point instructions may refer to compiled execution codes or any other instruction formats to be loaded to the host device. These point-to-point instructions may define all execution logic or co-work with other internal software or hardware of the host device to perform the aforementioned functions to perform a point-to-point connection or transmit the unique identification.

Several embodiments are explained as follows with associated drawings.

Figure 2:
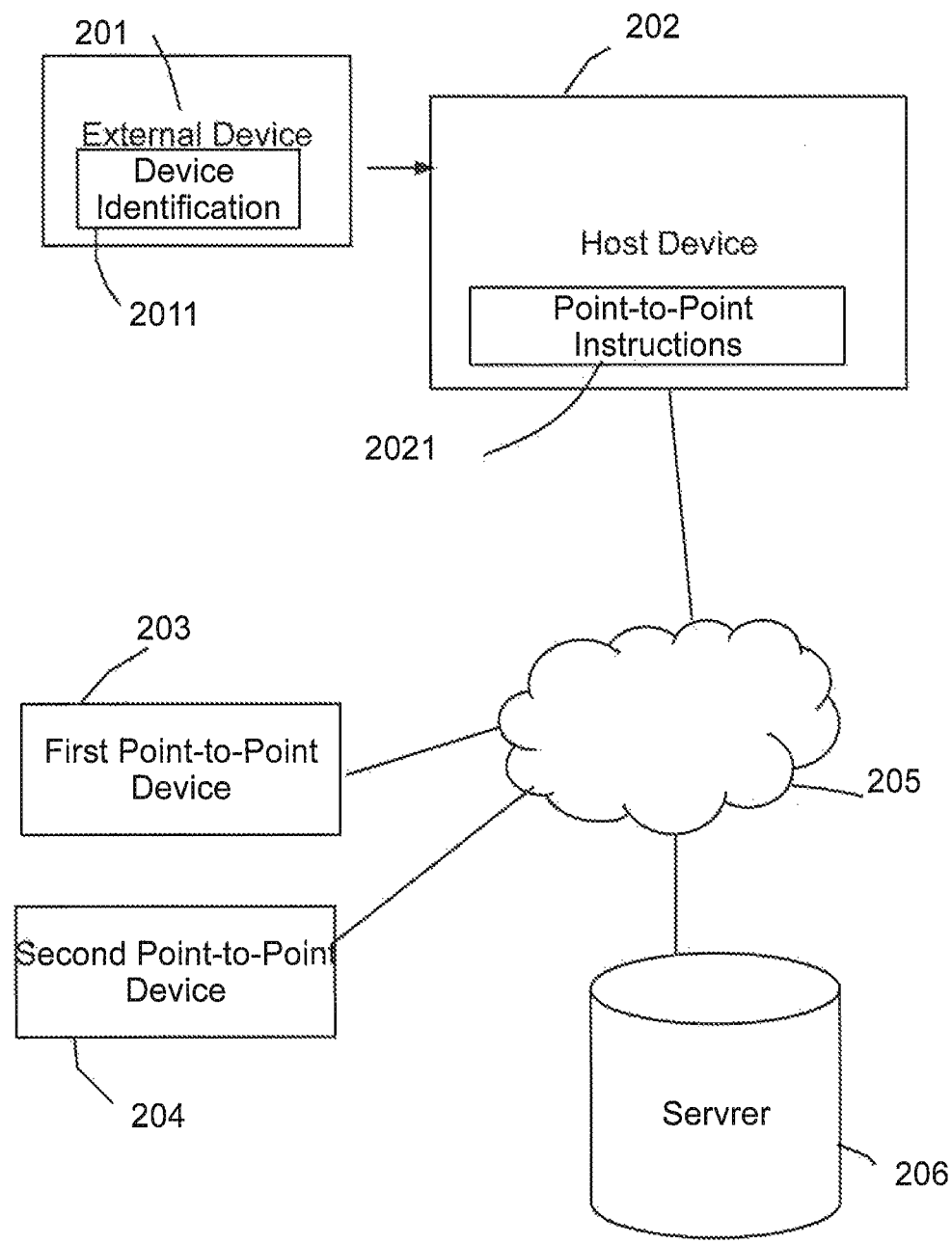
FIG. 2 illustrates a device structure according to an embodiment of the present invention.

FIG. 2 illustrates an embodiment according to the present invention. The external device 201 has a device identification 2011 and is for connecting to a host device 202. After or before the host device 202 is connected the external device 201, the point-to-point instructions are installed to the host device 202 via a network or other mechanism. When the external device 201 is connected to the host device 202, the host device 202 becomes a point-to-point device on a point-to-point network using the device identification code 2011. Specifically, according to a design of a point-to-point network, the host device 202 may use the device identification 2011 directly as the unique identification in the point-to-point network. Alternatively, the host device 202 may retrieve the unique identification associated to the device identification 2011 from the server 206 via a network 205.

When the host device 202 has the unique identification, the host device 202 regularly or irregularly transmits connection data and the unique identification to the server. As such, the server 206 obtains connection data necessary for connecting to the host device 202 associated with the unique identification. Next, other point-to-point devices on the point-to-point network, like the first point-to-point device 203 or the second point-to-point device 204, may establish a point-to-point connection to the host device 202 with assistance of the server 206.

Figure 3:
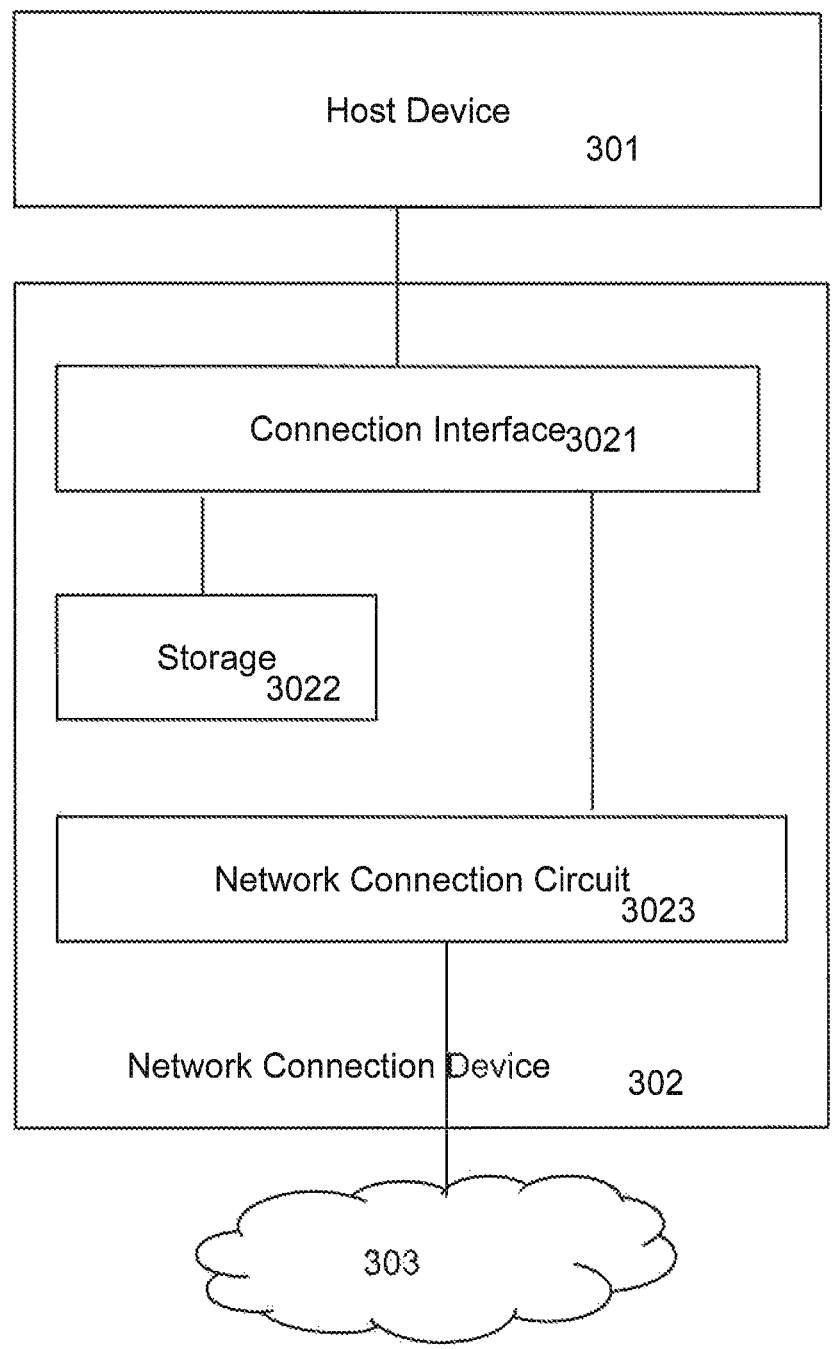
FIG. 3 illustrates an embodiment of an external device and a host device.

Please refer to FIG. 3, which illustrates an embodiment of such external device. The network connection device 302 is used as an external device to be connected to the host device 301. The network connection device 302 has a connection interface to be connected to the host device 301. The storage 3022 may be any kind of memory devices, like a flash memory or a ROM device for storing a device identification. When the host device 301 is connected to the network connection device 302 and the host device 301 retrieves the point-to-point instructions from the network connection device 302 or from a network, the host device 301 reads the device identification and retrieves an associated unique identification. The host device 301 provides a point-to-point connection to other point-to-point devices according to the point-to-point instructions.

In addition, the network connection device 302 has a network connection circuit 3023 of a communication protocol. For example, the network connection circuit 3023 may be a Wi-Fi router for establishing a Wi-Fi local network for Wi-Fi devices to connect to the Wi-Fi local network. The network connection circuit 3023 may also be a 3G or Wi-Fi network cards for the host device to connect to a 3G network or a Wi-Fi local network.

Figure 4:
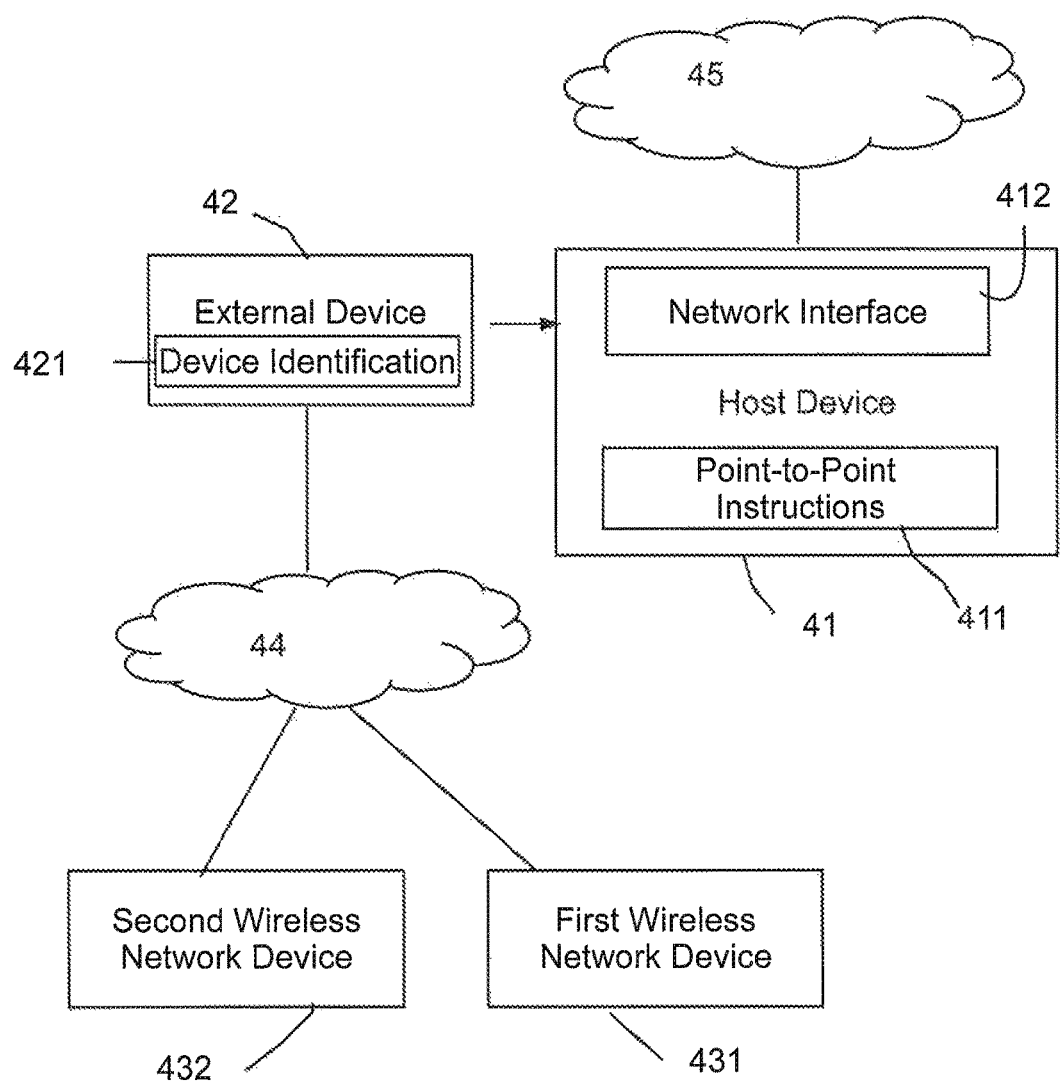
FIG. 4 illustrates an embodiment for establishing a local network by an external device.

Please refer to FIG. 4, which illustrates an embodiment according to the present invention. The host device 41 has a network interface 412 and stores the point-to-point instructions 411. The external device 42 stores the device identification 421. When the host device 41 is connected to the external device 42, the host device 41 retrieves an associated unique identification 421. The external device 42 has a network connection circuit for providing a wireless local network 44 for the first wireless network device 431 and the second wireless network device 432 to connect to the wireless local network 44. In addition, the first wireless network device 431 and the second wireless network device 432 are connected to an external network 45 like the Internet via the network interface 412 of the host device.

The first wireless network device 431 or the second wireless network device 432 may be a point-to-point device as mentioned above but it is not a necessary configuration. Because the external device 42 has the device identification 421, the host device 41 may become a point-to-point device with an associated unique identification. If the first wireless network device 431 is also a point-to-point device with a corresponding unique identification, the establishment of point-to-point connection between the first wireless device 431 and the host device 41 via the design of the point-to-point instructions. For example, the first wireless network device 431 may connect to a Wi-Fi local network of the external device 42 via Wi-Fi connection. After that, the first wireless network device 431 may query whether any point-to-point device exists on the local network. Because the host device 41 is connected to the external device 42 and becomes a point-to-point device, the host device 41 may establish a quick point-to-point connection to the first wireless device 431 according to the unique identifications of the host device 41 and the first wireless network device 431 on the Wi-Fi local network according to the point-to-point instructions. With such, even the host device 41 or the first wireless network device 431 do not connect to the Internet, a point-to-point connection network can still be established quickly.

When the host device 41 is computer, the external device 42 may be an USB Wi-Fi AP (Access Point). The device identification stored in the external device 42 may be the unique identification directly. The first wireless network device 431 and the second wireless network device 432 may be IP cameras with Wi-Fi function, and respectively have their own unique identifications. The point-to-point instructions 411 are stored in advance in the external device 42 and then be installed to the host device 41. Once a user buys the external device 42, the first wireless network device 431 and the second wireless network device 432, a monitor system can be established quickly without complicated setting because the host device 41 may authenticate and connect to the first wireless network device 431 and the second wireless network device 432 to perform video data transmission.

Figure 5:
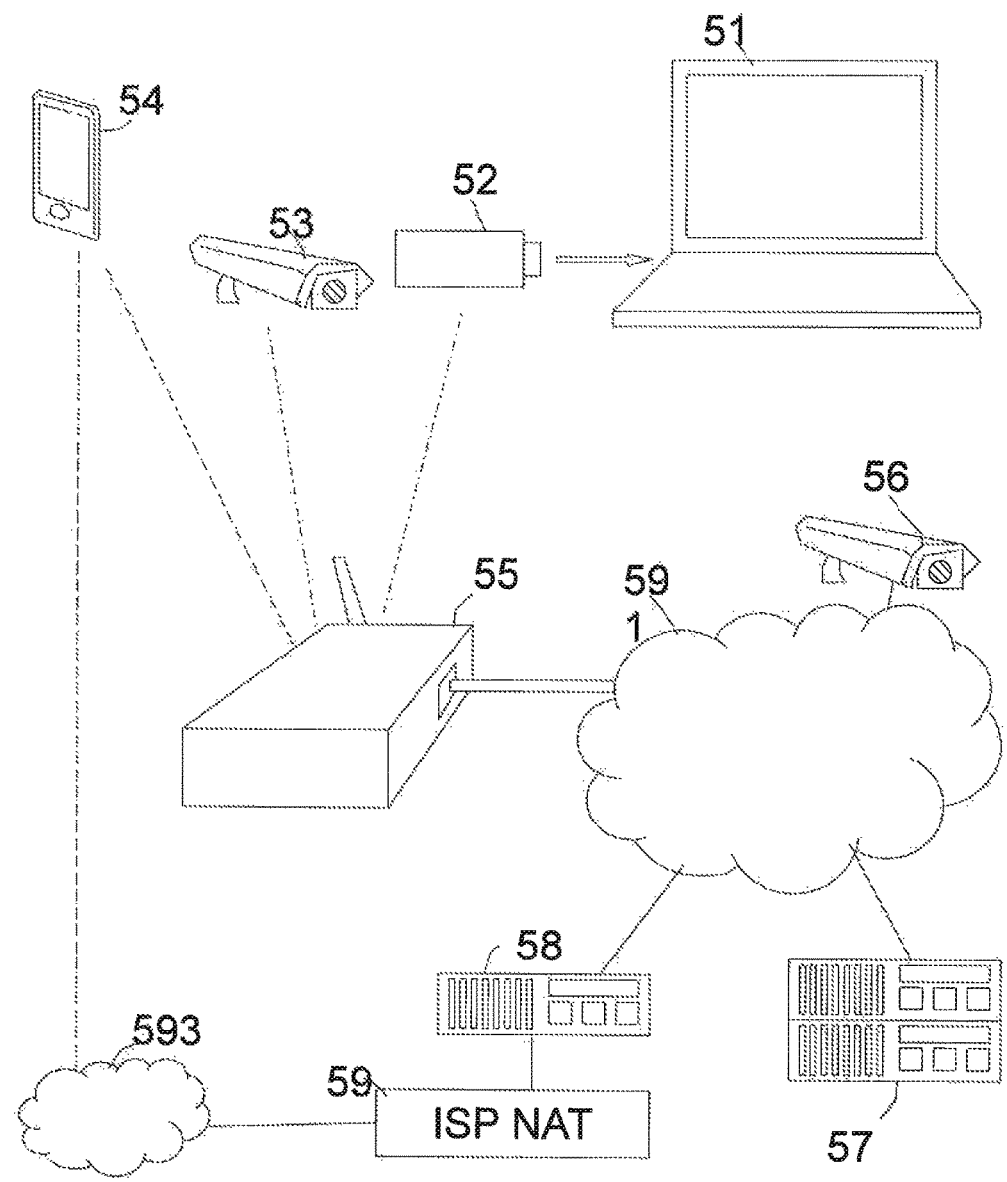
FIG. 5 illustrates a use example.

Please refer to FIG. 5, which illustrates another embodiment according to the present invention. The computer 51 is used as the host device connecting to a Wi-Fi network card 52. The Wi-Fi network card 52 stores a device identification serving as the external device as mentioned above. After the computer 51 is connected to the Wi-Fi network card 52, the Wi-Fi AP 55 may be connected. The computer 51 retrieves the device identification of the Wi-Fi network card 52 and retrieves directly or indirectly an associated unique identification to become a point-to-point device on a point-to-point network. The computer 51 retrieves the point-to-point instructions from the Wi-Fi network card 52 or from a network.

The IP camera 53, the IP camera 56 and the mobile phone 54 respectively have their own unique identifications to be point-to-point devices. The IP camera 56, the IP camera 53 and the mobile phone 54 respectively connect to different telecommunication network 591 and the Internet 593. The computer 51 regularly or irregularly reports its connection data and the unique identification to the server 57 on the Internet 591. Other point-to-point devices also reports their connection data and unique identifications to the server 57. With the assistance of the server 57 as well as corresponding point-to-point instructions in each point-to-point device, these point-to-point devices may establish point-to-point connections to each other even they are located in different sub-networks via various hole punching techniques.

For example, the mobile phone 54 is located behind a NAT (Network Address Translation) device of an ISP (Internet Service Provider) in a telecommunication network 593, the mobile phone 54 does have a static IP address. Nevertheless, the mobile phone periodically sends its connection data like connection port and certain IP address and its unique identification to the server 57 via the gateway 58 over the Internet 591. With such, the computer 51 may connect to the mobile phone 54 with assistance of the server 57 to establish a point-to-point connection to the mobile phone 54.

On the other hand, the mobile phone 54 may also connect to the computer 51 with assistance of the server 57 to access the resources of the computer 51, e.g. a hard disk, a network drive or a camera of the computer 51.

Figure 6:
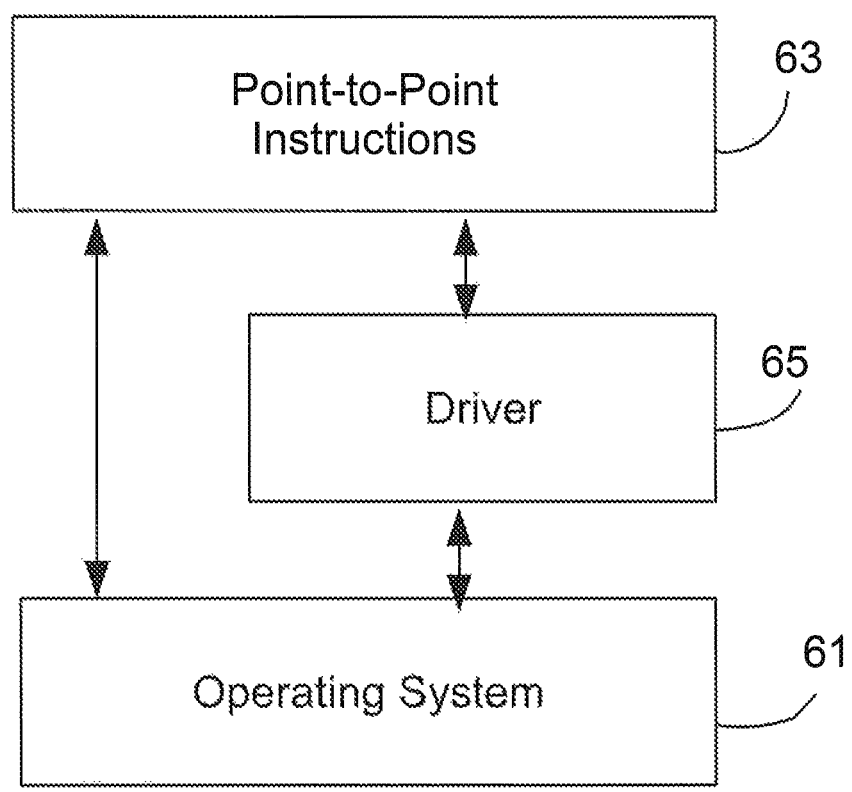
FIG. 6 illustrates a diagram of a point-to-point instruction.

Please refer to FIG. 6, which illustrates a way to implement installation of the point-to-point instructions 63 to the host device. The point-to-point instructions 63 are retrieved from a network or from an external device and installed on the host device to become an application module on the host device. Such architecture is available on devices based on WINDOWS, MAC, LINUX, ANDROID or IOS systems. The point-to-point instructions 63 may call corresponding drivers 65 to access data of resources like a camera or a hard disk. In addition, the point-to-point instructions 63 may be used to access a network connection to a server or a point-to-point device via the operating system 61 and may be used to instruct the host device to perform corresponding operations.

Such operations may include, but not limited to, access to resources of cameras, hard disks, establishing UDP or TCP connection with devices over a network, performing various hole punching techniques, reporting its unique identification to a remote server with static IP address, providing an operating interface for a user to perform setting, authentication, selection of connections and operations on selected point-to-point devices. Such operations may be adjusted according to the different application needs and details of implementation may be referenced to corresponding reference manuals and are not repeated in more details here.

Figure 7:
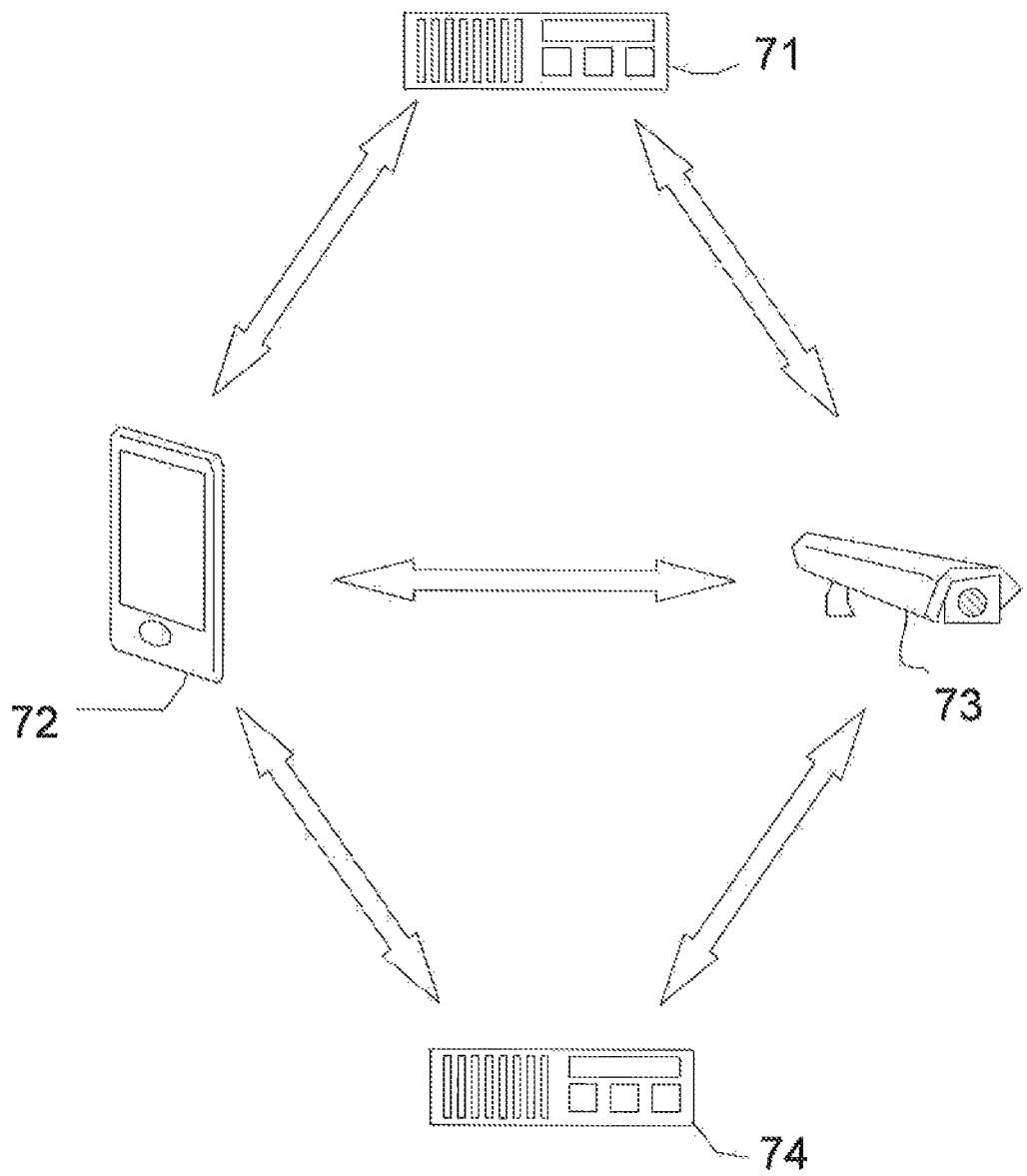
FIG. 7 illustrates a way for providing point-to-point service.

FIG. 7 illustrates a method for providing point-to-point connection. The point-to-point device 72 and the point-to-point device 73 regularly report their unique identifications and connection data to a main server 71 with a static IP address. When the point-to-point device 72 request to connect to the point-to-point device 73, it sends a connection request to the main server 71. The main server 71 selects a point-to-point server 74 from multiple candidates according to different circumstances. Next, the point-to-point server 74 assists the point-to-point device 72 to connect to the point-to-point device 73. With such, the loading of the main server 71 may be decreased for serving more point-to-point connections among the point-to-point devices.

In addition, the unique identification may be generated in various algorithms or rules in numeric, text or their combinations. The point-to-point connections may be implemented via various ways, e.g. using various hole punching techniques to solve, the problems when devices do not have static IP addresses to be identified when located behind NAT devices. The point-to-point connection may also include direct or indirect non-IP network connections or a combination of IP network, a public network, a private network and a telecommunication network. The point-to-point connection may also include relaying as part or all of the connections.

Furthermore, the unique identification may correspond to multiple devices. For example, two or more devices share one unique identification. Once other point-to-point device wants to send data to the point-to-point devices sharing the same unique identification, multi-cast is used for performing data transmission. On the other hand, messages transmitted from any of multiple point-to-point device sharing the same unique identification may be regarded messes from the unique identification. One device may also correspond to multiple unique identifications. For example, a device may be assigned a first unique identification for its own use while also being assigned a second unique identification that is shared with other point-to-point devices in a group. When other point-to-point devices sends messages to either the first unique identification or the second unique identification, the device can receive such messages. More possibilities and applications may be designed on such flexible configuration.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A method for enabling a host device to perform point-to-point transmission, comprising:
   storing a device identification representing an external device in the external device, wherein the external device is connected to the host device;
   providing a point-to-point program instruction to be installed on the host device; and
   providing a server that is remote from the host device and the external device, wherein when the host device is connected to the external device and installed with the point-to-point instruction, the host device sends the device identification to the server, the server derives a unique identification by calculating the device identification with a function, and the server sends the unique identification to the host device, wherein the host device informs the server with connection data and the unique identification,
   the unique identification being used to identify the host device in a point-to-point transmission network; and
   wherein the server provides the connection data of the host device to a point-to-point device so that the point-to-point device is connected to the host device with a point-to-point connection,
   wherein the external device is a wireless router for establishing a wireless network for the point-to-point device and queried by the point-to-point device to establish the point-to-point connection according to the point-to-point instruction.

2. The method of claim 1, wherein the host device is a computer.

3. The method of claim 1, wherein the external device is an USB device.

4. The method of claim 3, wherein the USB device is an USB wireless router for establishing the wireless network so that a wireless network device is connected to an external network via a network interface of the host device from the wireless network.

5. The method of claim 1, wherein the external device is stored with an auto-execution instruction, and when the host device is connected to the external device, the point-to-point instruction is downloaded according to the auto-execution instruction.

6. The method of claim 1, wherein the external device is a network adaptor for the host device to be connected to a network.

7. The method of claim 1, wherein the point-to-point device accesses a storage of the host device.

8. The method of claim 1, wherein the point-to-point device accesses a multimedia device attached on the host device.

9. The method of claim 1, wherein the device identification is sent from the host device to the server via the external device.

10. A network connecting device for being coupled to a host device, comprising:
    a connecting interface to be connected to the host device;
    a storage for storing a device identification representing the network connecting device, wherein based on a connection between the host device and the network connecting device and based on the host device being installed with a point-to-point instruction, the host device sends the device identification to a server remote from the host device and the storage and receives, from the server, a unique identification generated by the server calculating the device identification with a function, and the host device, according to the point-to-point instruction, transmits the unique identification and connection data to the server of the point-to-point network, the unique identification being used to identify the host device in the point-to-point network, and the server helps a point-to-point device to be connected with the host device via a point-to-point connection by providing the unique identification and the connection data; and
    a network connecting circuit for providing the host device a network service of a communication protocol after the host device is connected to the connecting interface, the network connecting circuit comprising a wireless router configured to establish a wireless network for the point-to-point device and queried by the point-to-point device to establish the point-to-point connection according to the point-to-point instruction.

11. The network connecting device of claim 10, wherein the network service comprises establishing a wireless local network so that a wireless communication device is able to connect to an external network via a network interface of the host device from the wireless local network.

12. The network connecting device of claim 10, wherein the host device is enabled for connecting to an external network via the network connecting circuit.

13. The network connecting device of claim 10, wherein the storage further stores an auto-execution instruction, and when the network connecting device is connected to the host device, the host device retrieves and executes the auto-execution instruction to deliver the device identification to the server of the point-to-point network and retrieves the point-to-point instruction from the server.

14. The network connecting device of claim 10, wherein the host device retrieves the point-to-point instruction from a network.

15. The network connecting device of claim 10, wherein the host device, according to the point-to-point instruction, emulates a storage space of the host device as a network storage to be accessed by the point-to-point device.

16. The network connecting device of claim 10, wherein the host device, according to the point-to-point instruction, provides a wireless device connected to the host device to be accessed by the point-to-point device of the point-to-point network.

17. The network connecting device of claim 10, wherein the device identification is sent from the host device to the server via the external device.

* * * * *